(12) United States Patent
Wagner et al.

(10) Patent No.: US 6,590,595 B1
(45) Date of Patent: Jul. 8, 2003

(54) MECHANISM FOR PROVIDING INTUITIVE SCROLLING FEEDBACK

(75) Inventors: Annette Wagner, Los Altos, CA (US); Osana Tishkova, Palo Alto, CA (US); Richard Berlin, Fremont, CA (US); Fazeel Mufti, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/500,287

(22) Filed: Feb. 8, 2000

(51) Int. Cl.$^7$ ................................................. G09G 5/00
(52) U.S. Cl. ........................ 345/784; 345/786; 345/787; 345/772
(58) Field of Search ................................. 345/784, 785, 345/786, 787, 719, 720, 721, 722, 772; 725/37, 38, 52, 53

(56) References Cited

U.S. PATENT DOCUMENTS

| | | | | |
|---|---|---|---|---|
| 5,202,961 A | * | 4/1993 | Mills et al. | 345/720 |
| 5,553,225 A | * | 9/1996 | Perry | 345/786 |
| 5,757,370 A | * | 5/1998 | Amro et al. | 345/787 |
| 5,872,566 A | * | 2/1999 | Bates et al. | 345/786 |
| 5,995,079 A | * | 11/1999 | Sheasby et al. | 345/856 |
| 6,157,381 A | * | 12/2000 | Bates et al. | 345/786 |
| 6,204,846 B1 | * | 3/2001 | Little et al. | 345/784 |
| 6,259,432 B1 | * | 7/2001 | Yamada et al. | 345/159 |
| 6,268,854 B1 | * | 7/2001 | Borden et al. | 345/786 |
| 6,331,866 B1 | * | 12/2001 | Eisenberg | 345/784 |
| 6,339,438 B1 | * | 1/2002 | Bates et al. | 345/787 |
| 6,380,953 B1 | * | 4/2002 | Mizuno | 345/764 |

OTHER PUBLICATIONS

Ben Shneiderman, Dynamic Queries For Visual Information Seeking 1999, Information Visualization Using Vision To Think, Morgan Kaufmann Puplishers, pp. 238, 240.*

* cited by examiner

Primary Examiner—Kristine Kincaid
Assistant Examiner—Gary Nhon Nguyen
(74) Attorney, Agent, or Firm—Hickman Palermo Truong & Becker LLP; Bobby K. Truong; Christian A. Nicholes

(57) ABSTRACT

An intuitive scrolling feedback mechanism is provided to enable novice and infrequent computer users to understand and to utilize the scrolling functionality offered by a computing device. Scrolling feedback is provided by displaying a portion of a set of information in a display area. In addition, a control region is displayed, comprising one or more activable controls. These controls, when activated by a user via a user interface, cause a different portion of the set of information to be displayed in the display area. In addition, a status region is displayed, comprising a plurality of location indicators. A subset of the location indicators is displayed in a first manner (e.g. a darker color), while the remainder of the location indicators is displayed in a second and different manner (e.g. a lighter color). The subset of the indicators is determined based upon the portion of the set of information that is currently being displayed in the display region. In effect, the location indicators provide the user with an indication as to where the currently displayed portion is relative to the entire set of information. As the user scrolls forward in the set of information, more location indicators are "filled in" with the darker color. As the user scrolls backward, location indicators are "unfilled". At any time, the user can get a sense of how far into the set of information he has scrolled by simply viewing the status region. This "filling" and "unfilling" of the location indicators gives the user a very intuitive feel of the scrolling process.

15 Claims, 6 Drawing Sheets

MECHANISM FOR PROVIDING INTUITIVE SCROLLING FEEDBACK

BACKGROUND

This invention relates generally to computing systems and more particularly to a mechanism for providing intuitive scrolling feedback to a user.

One use of computer systems is to allow a user to interact with information displayed on a computer display screen. The user may interact with the displayed information using a keyboard, a pointing device such a a "mouse", or by touching portions or regions of the display itself (via a touch screen). Unfortunately, the use or manipulation of such displays can be confusing to users who have not had much experience with computer systems. Current display paradigms lack adequate intuitive cues to enable a novice or infrequent user to have a satisfactory computing experience. As a result, a user may become frustrated and/or unable to interact with the displayed information in a desired manner. Problems and disadvantages of interacting with displayed information can be understood by reviewing current approaches to the display and manipulation of information.

The means by which a computer user communicates with a computer is referred to as a "user interface" (UI). A UI typically comprises a computer display screen and one or more input devices (keyboard, mouse, or touch screen, for example), as well as the computer software that interprets input and provides images displayed on the computer display. Commonly, information is displayed in one or more rectangular display areas, often referred to as "windows" or "panes".

Sometimes the information to be displayed to the user, for example, a list, a text document, or a graphical image, is too large to be shown in the display area in its entirety. When this occurs the display area can often be "scrolled" or "panned" to a new position in the information such that the display area now shows portions of the information that the user was previously unable to see (and correspondingly, previously displayed portions may now no longer be displayed). The term scrolling is used herein to refer to both scrolling and panning. A problem with existing scrolling mechanisms is that users unfamiliar with computer systems may have trouble understanding how to operate them.

FIG. 1 illustrates an example of a prior art window with scroll bars. Window 100 shown in FIG. 1, is an interface for a word processing program. Window 100 features a vertical scroll bar 120 and a horizontal scroll bar 130. These scroll bars 120, 130 allow the user to scroll the portion of a document displayed in a display area 110 up and down, and right to left, respectively.

The user may cause the information in the display area 110 to be scrolled in several ways. For example, the user can scroll the information in the display area 110 up by activating the up arrow 121. Activating the down arrow 122 scrolls the information in the display area 110 down. If the user clicks on the double down arrow 124, the end or the bottom of the document is displayed. If the user clicks on the double up arrow 125, the top or the beginning of the document is displayed in the display area 110. The double arrows 124, 125 provide convenient mechanisms for quickly jumping to the beginning or the end of a document.

The user can also drag the square box 123 up or down. This box 123 is sometimes referred to as an "elevator" or a "thumb". When the user moves the square box 123, the contents of the display area 110 are scrolled, and the page number corresponding to the portion of the document that is currently displayed in the display area 110 is shown at the bottom left of the display area 110. Whether the contents of the display area 110 are moved up or down depends upon the direction in which the thumb 123 is moved. The horizontal thumb 133 may be operated in a similar fashion. By dragging the thumb 133 left or right, the contents of the display area 110 are moved left or right.

In addition, the user may cause information in the display area 110 to be moved by clicking within the scroll area above or below the thumb 123, or by clicking within the scroll area to the right or left of the thumb 133. If the user clicks above the thumb 123, the document is scrolled up by a certain increment. If the user clicks below the thumb 123, the document is scrolled own by a certain increment. Likewise, if the user clicks to the left of the thumb 133, the document is scrolled left by a certain increment. If the user clicks to the right of the thumb 133, the document is scrolled right by a certain increment.

As the above discussion shows, operation of the prior art scrolling mechanism can be relatively complex and non-intuitive. For users who are unfamiliar with operating computer systems, it may present a barrier to effective inter action between a user and a system. This in turn may lead to lost sales and/or business.

SUMMARY OF THE INVENTION

To overcome the shortcomings of the prior art, the present invention provides a more intuitive scrolling feedback mechanism which enables even novice and infrequent users to quickly understand and to utilize the scrolling functionality. In accordance with one embodiment, the present invention provides scrolling feedback to a user by displaying a portion of a set of information in a display area. In addition, a control region is displayed, comprising one or more activable controls. These controls, when activated by a user via a user interface, cause a different portion of the set of information to be displayed in the display area. In one embodiment, the activable controls comprise a forward scrolling control for scrolling forward in the set of information, and a backward scrolling control for scrolling backward in the set of information. In addition, a status region is displayed, comprising a plurality of location indicators. A subset of the location indicators is displayed in a first manner, while the remainder of the location indicators is displayed in a second and different manner. The subset of the indicators is determined based upon the portion of the set of information that is currently being displayed in the display region. In effect, the location indicators provide the user with an indication as to where the currently displayed portion is relative to the entire set of information.

In one embodiment, the location indicators take the form of visual indicators displayable in one of two colors: (1) a light color; and (2) a darker color to provide an impression that the indicator has been "filled in". When the beginning of a set of information is displayed in the display area, all of the location indicators are displayed in the light color to indicate that the user is currently viewing the beginning of the set of information. As the user invokes the forward scrolling control in the control region, the information displayed in the display area is scrolled forward, and a subset of the location indicators begins to be displayed with the darker color. The size of the subset depends upon how far into the set of information the user has scrolled. For example, if the user has scrolled to the middle of the set of information, then approximately half of the location indicators will be displayed in the darker color, with the remainder of the location indicators being displayed in the lighter color. When scrolling reaches the end of the set of information, all of the location indicators are displayed in the darker color to indicate that the user has reached the end of the set of information. The user may also invoke the backward scrolling control in the control region to scroll backward in the set of information. As the user scrolls backward, the subset of darker color location indicators decreases while the number of light color indicators increases. When the user reaches the beginning of the set of information, all of the location indicators are displayed in the light color.

In the manner described, the present invention provides a highly intuitive mechanism for providing scrolling feedback to a user. As the user scrolls forward in the set of information, more location indicators are "filled in". As the user scrolls backward, location indicators are "unfilled". At any time, the user can get a sense of how far into the set of information he has scrolled by simply viewing the status region. With this intuitive and easy to understand feedback mechanism, even novice and infrequent computer users can quickly and easily take advantage of the scrolling functionality offered by the present invention.

DETAILED DESCRIPTION OF THE EMBODIMENT(S)

Due to various factors, such as limited display areas, it is often not possible to display an entire set of information within a certain display area. For example, a list of items may be too long to be shown in its entirety, or a document or graphical image may be too large to fit completely within a display area. In such instances, it is necessary to implement a scrolling functionality to enable a user to view a portion of the set of information at a time. The scrolling functionality may be implemented to enable the user to scroll horizontally, vertically, or both. In the following discussion, scrolling is described generically in terms of moving forward and backward in a set of information. For horizontal scrolling, moving forward is scrolling to the right, and moving backward is scrolling to the left. For vertical scrolling, moving forward is scrolling down, and moving backward is scrolling up. For purposes of the present invention, the term "set of information" is used broadly to encompass any type of information that can be displayed to a user, including but not limited to text, graphics, and data.

Figure 1:
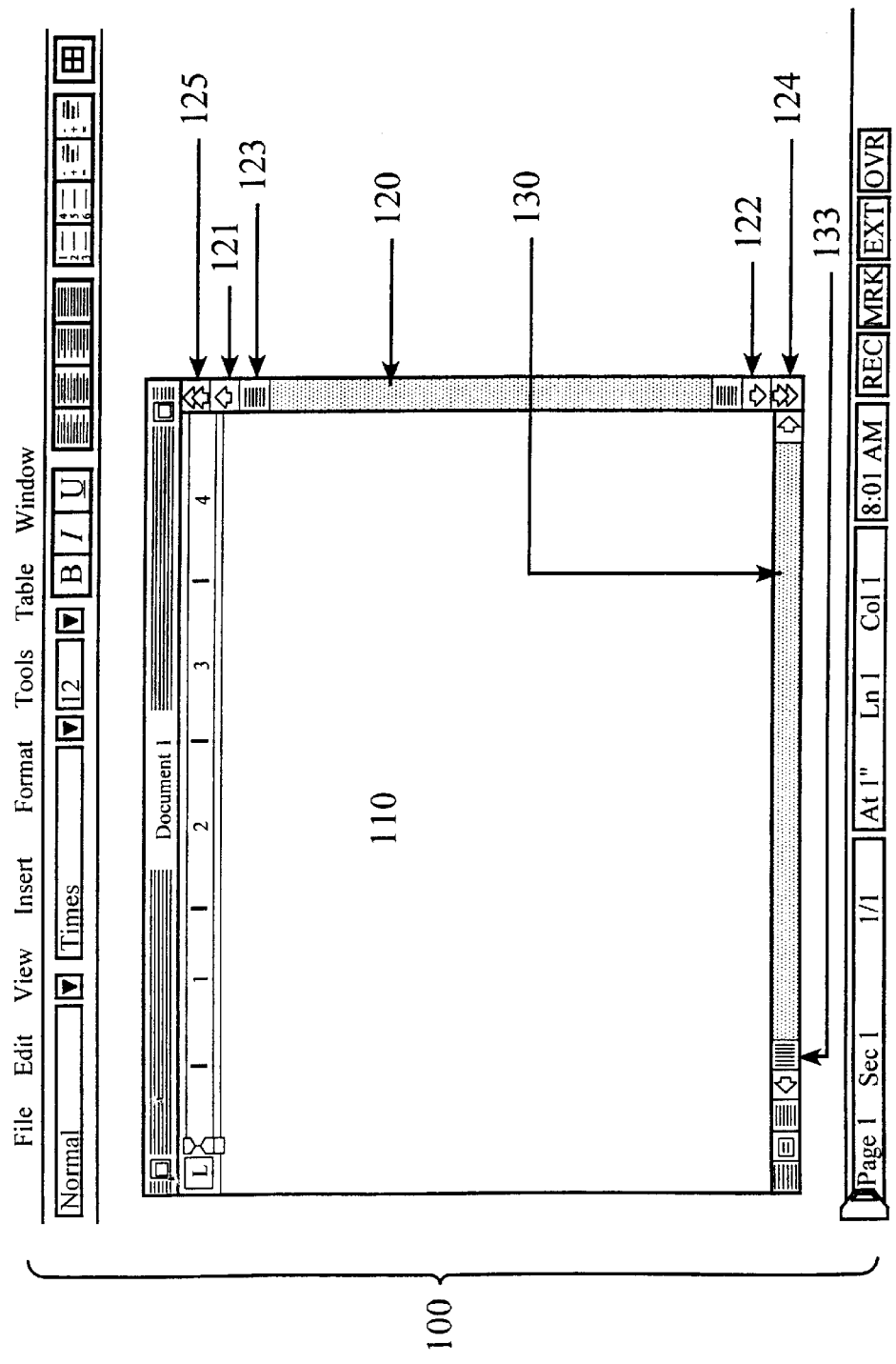
FIG. 1 provides an example of a prior art scrolling feedback mechanism.
Figure 2:
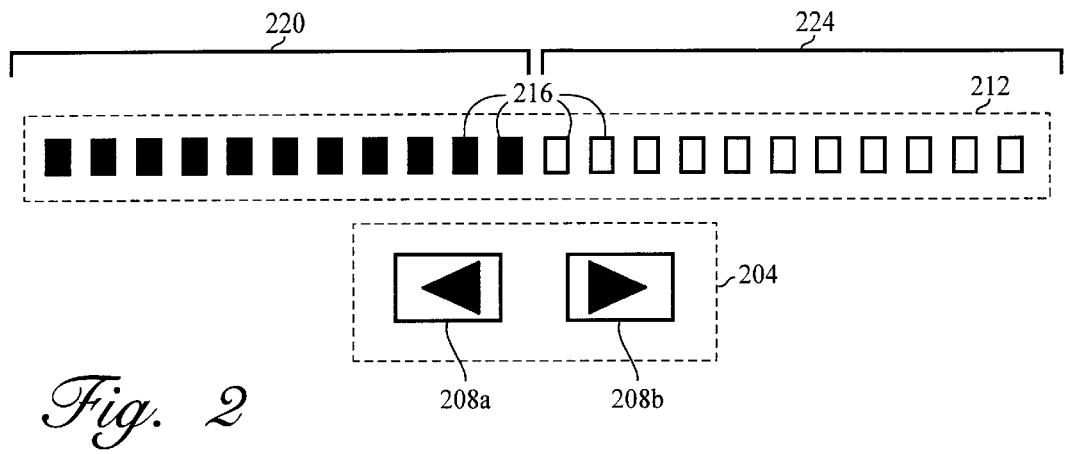
FIG. 2 shows an embodiment of the scrolling feedback mechanism of the present invention which may be used to implement horizontal scrolling.

With reference to FIG. 2, there is shown one embodiment of the scrolling feedback mechanism of the present invention. The embodiment shown in FIG. 2, which may be used to implement horizontal scrolling, comprises a control region 204 and a status region 212. The control region 204 comprises one or more activable controls 208 which may be activated by a user via a user interface to cause information displayed in a display area (not shown) to scroll. In the embodiment shown, the control region 204 comprises a backward scrolling control 208a, which when activated causes information to scroll backward by a certain increment, and a forward scrolling control 208b, which when activated causes information to scroll forward by a certain increment. For purposes of the present invention, activable controls 208a, 208b may be activated by a user via any desired user interface mechanism, including but not limited to a keyboard, a mouse or other pointing device, and a touch screen.

The status region 212, displayed above the control region 204, provides the user with information as to what portion of the set of information the user is currently viewing. The status region 212 comprises a plurality of location indicators 216. In the embodiment shown, a subset 220 of the indicators 216 is displayed using a darker color to give the impression of being "filled in", while the remainder 224 of the indicators 216 are displayed in a lighter color. The proportionality between the subset 220 and the remainder 224 depends upon the portion of the set of information that is currently being displayed in the display area. More specifically, as information is scrolled backward using control 208a, the subset 220 of indicators 216 decreases while the remainder 224 increases. When the beginning of the set of information is reached, the subset 220 becomes zero such that all of the indicators 216 are displayed in the lighter color. This lets the user know that the beginning of the set of information has been reached. Conversely, when the forward scrolling control 208b is activated to scroll forward in the set of information, the subset 220 of indicators 216 increases while the remainder 224 decreases. When the end of the set of information is reached, the subset becomes the entire set of indicators 216 such that all of the indicators 216 are displayed using the darker color. This lets the user know that the end of the set of information has been reached. Thus, as the user scrolls forward in the set of information, location indicators 216 are "filled in". As the user scrolls backward, location indicators 216 are "unfilled". This filling and unfilling of the indicators 216 provides the user with a very intuitive feel of the scrolling process. As a result, even novice and infrequent users of computers can quickly and easily grasp and take advantage of the scrolling functionality offered by the present invention.

Figure 3:
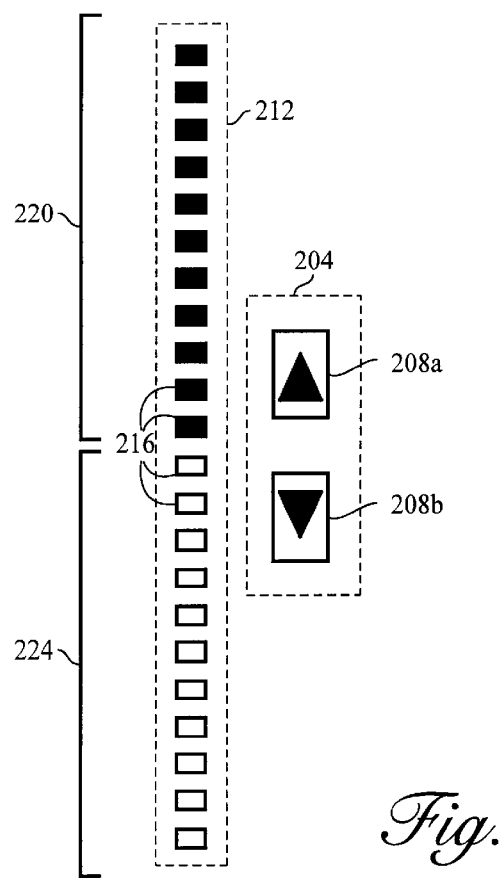
FIG. 3 shows an embodiment of the scrolling feedback mechanism of the present invention which may be used to implement vertical scrolling.

With reference to FIG. 3, there is shown an embodiment of the scrolling feedback mechanism of the present invention which may be used to implement vertical scrolling. Like the embodiment of FIG. 2, this embodiment comprises a control region 204 and a status region 212. The control region 204 comprises a backward scrolling control 208a, which when activated causes information to scroll backward by a certain increment, and a forward scrolling control 208b, which when activated causes information to scroll forward by a certain increment.

The status region 212, displayed next to the control region 204, comprises a plurality of location indicators 216. A subset 220 of the indicators 216 is displayed using a darker color to give the impression of being "filled in", while the remainder 224 of the indicators 216 are displayed in a lighter color. As with the embodiment shown in FIG. 2, the proportionality between the subset 220 and the remainder 224 depends upon the portion of the set of information that is currently being displayed in the display area. As the user scrolls forward in the set of information, the subset 220 of indicators 216 increases so that more indicators are "filled in". As the user scrolls backward in the set of information, the subset 220 of indicators 216 decreases so that more indicators are shown as "unfilled". In most respects, the embodiment shown in FIG. 3 is similar to the embodiment shown in FIG. 2. The main differences are that: (1) in FIG. 3, the status region 212 is displayed to the side, as opposed to on top of, the control region 204; and (2) the embodiment shown in FIG. 3 is used to implement vertical scrolling as opposed to horizontal scrolling.

Figure 4:
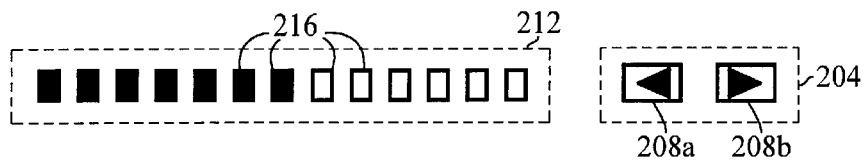
FIG. 4 shows an alternate embodiment of the scrolling feedback mechanism of the present invention which may be used to implement horizontal scrolling.
Figure 5:
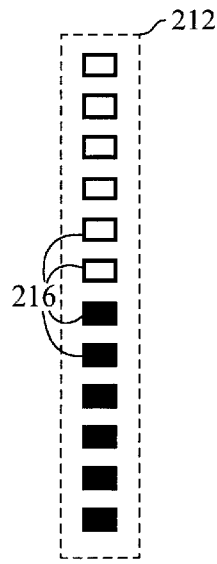
FIG. 5 shows an alternate embodiment of the scrolling feedback mechanism of the present invention which may be used to implement vertical scrolling.

FIGS. 2 and 3 show two possible visual representations of the scrolling feedback mechanism of the present invention. FIGS. 4 and 5 show two other possible representations. In FIG. 4, there is shown a horizontal scrolling mechanism wherein the status region 212 is displayed to the side (as opposed to on top) of the control region 204. In FIG. 5, there is shown a vertical scrolling mechanism wherein the status region 212 is displayed above (as opposed to the side of) the control region 204. These and many other visual representations are possible. For purposes of the present invention, any visual representation which presents scrolling information to a user in an intuitive manner may be used.

Figure 6:
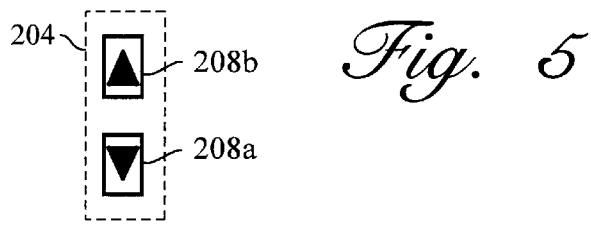
FIG. 6 shows an expanded control region comprising additional activable controls in accordance with the present invention.
Figure 6:
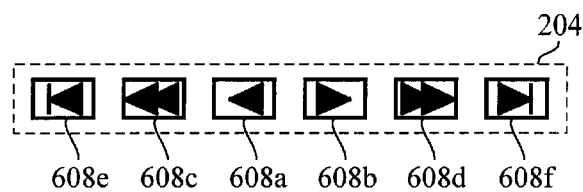

Thus far, the control region 204 has been described as having a minimum of activable controls 208a, 208b. It should be noted, though, that if so desired, the control region 204 may be expanded to comprise additional controls. An example of an expanded control region 204 is shown in FIG. 6, wherein the control region 204 comprises six controls 608a–608f. Controls 608 include a backward scrolling control 608a and a forward scrolling control 608b. These controls 608a and 608b, similar to the controls 208a and 208b discussed previously, cause information displayed in a display region to be scrolled backward or forward by a certain increment. This increment is a relatively small increment, such as a few lines in the case of vertical scrolling, or a few characters in the case of horizontal scrolling.

The controls 608 further include a fast backward control 608c and a fast forward control 608d. These controls 608c, 608d, when activated, cause the information in the display area to be scrolled backward or forward, respectively, by a relatively large increment. This increment is significantly larger than the increment set for the controls 608a and 608b, and in one embodiment, is set to slightly less than the size of the display area. The main purpose of controls 608c and 608d is to enable a user to scroll through a large set of information more quickly than with controls 608a and 608b.

In addition, the control region 204 further comprises a "go to beginning" control 608e and a "go to end" control 608f. When activated, these controls 608e, 608f cause the information displayed in the display area to be scrolled all the way to the beginning or the end of the set of information. Controls 608e and 608f may be activated at any time. Thus, with a single control activation, a user can jump to the beginning or the end of a set of information from anywhere within the set of information. The additional controls in the expanded control region 204 provide a user with a greater set of scrolling functionality. If so desired, more or fewer controls may be implemented in the control region 204.

Figure 7:
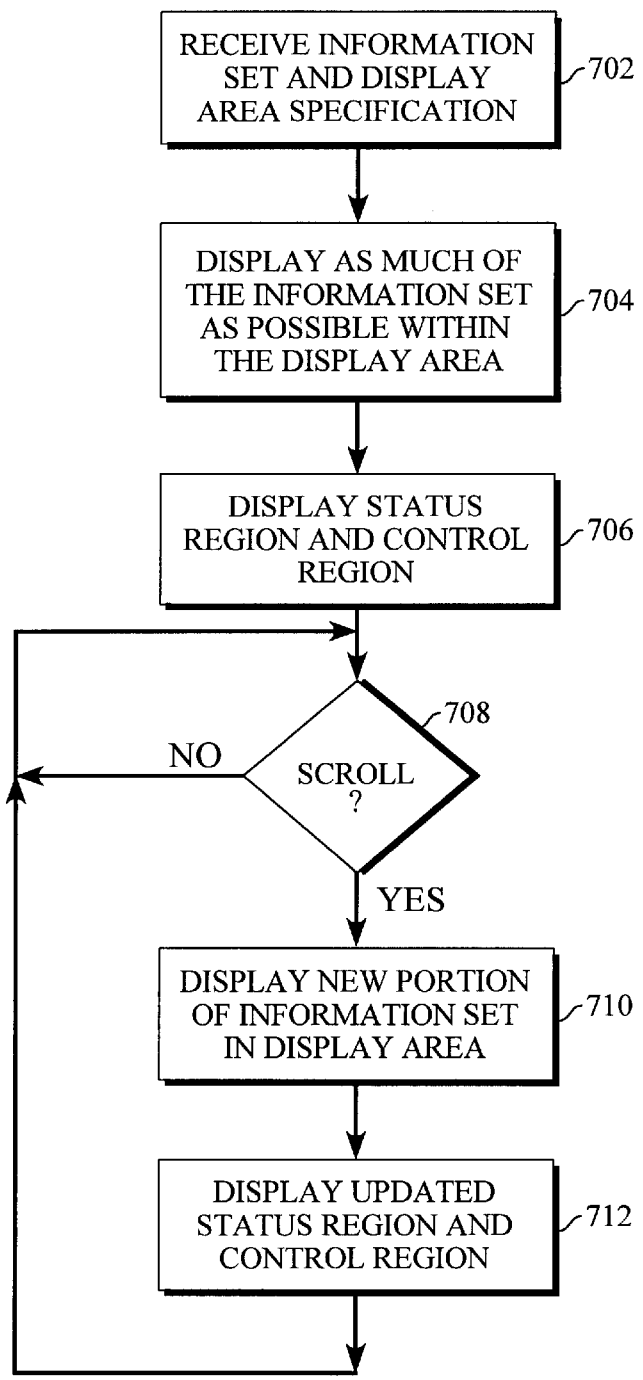
FIG. 7 is a flow diagram illustrating the flow of operation of the scrolling mechanism of the present invention.

The visual representation of the scrolling feedback mechanism has been disclosed. With reference to the flow diagram of FIG. 7, the operation of the scrolling mechanism will now be described. The scrolling mechanism begins operation by receiving (702) a set of information and a display area specification. As noted previously, the set of information may be any type of information including but not limited to text, graphics, and data. Whatever form the set of information takes, it has an associated set of dimensions. Likewise, the display area also has an associated set of dimensions. These dimensions, along with some other information such as the location of the display area on a display, are specified by the display area specification. In response to this input, the scrolling mechanism displays (704) within the display area as much of the information set as possible. If the entire information set will fit within the display area, then the entire information set is displayed. However, if only a portion of the information set will fit within the display area, then only a portion of the information set is displayed. The rest of the information set is "clipped". In one embodiment, the portion of the information set that is initially displayed in the display area is the beginning portion. However, if so desired, a different portion of the information set may be initially displayed.

Once the information set (or a portion thereof) is displayed, the scrolling mechanism proceeds to display (706) a status region 212 and a control region 204 associated with the display area, in accordance with the present invention. The status region 212 may be displayed within the display area, or outside of and completely decoupled from the display area. Likewise, the control region 204 may be displayed within the display area, or outside of and completely decoupled from the display area. In addition, the status region 212 and the control region 204 may be displayed in any manner relative to each other. For example, the status region 212 may be displayed on top of, below, or to the side of the control region 204, as previously discussed.

In one embodiment, a certain amount of space is given to the status region 212 for its display. Since the size of this space may vary from implementation to implementation, the present invention provides a mechanism for automatically adjusting the size of the status region 212 to fit within the allotted space. More specifically, prior to displaying the status region 212, the scrolling mechanism determines the amount of space that has been allocated to the status region 212. Depending upon the amount of allocated space, the scrolling mechanism adjusts the number of location indicators 216 in the status region 212. By doing so, the scrolling mechanism ensures that the proper number of indicators 216 are shown in the status region 212 and that all indicators are properly displayed in the space provided.

Once the proper number of location indicators 216 is determined, the status region 212 is displayed with a subset 220 of the indicators 216 being displayed in a first manner (e.g. in a darker color) and the remainder 224 of the indicators 216 being displayed in a second and different manner (e.g. in a lighter color). As noted above, in one embodiment, the portion of the set of information that is initially displayed in the display area is the beginning of the information set. If that is the case, then all of the location indicators 216 are displayed in the lighter color to indicate that the beginning of the set of information is being displayed.

However, if a different portion of the information set is displayed within the display area, then the scrolling mechanism will need to determine the proportionality between the subset 220 and the remainder 224 of the location indicators 216 based upon the portion of the information set that is currently being displayed in the display area. To illustrate how this proportionality is determined, reference will be made to an example.

Suppose that a set of information has one hundred vertical lines, with a minimum line value of zero and a maximum line value of ninety-nine. Suppose further that the information is to be displayed in a display area that can accommodate only twenty lines at a time. If the first line that is displayed in the display area is defined as the current line or current value, then it follows that the range of possible values for the current value is equal to the number of lines in the set of information (one hundred) minus the number of lines that can be displayed at a time (twenty), or eighty in this example. When the current value reaches eighty, the display area is displaying all of the lines at the end of the set of information. Hence, in this example, the number eighty is used as the denominator in the proportionality calculation.

Now, suppose that the first line currently displayed in the display area is the fortieth line of the set of information. If that is the case, then the proportionality is determined by dividing the current value (forty) by the range of possible current values (eighty) to derive 0.5 or half. Given this proportionality, the subset 220 will be half of the indicators 216 and the remainder 224 will be the other half. Thus, half of the location indicators 216 will be displayed in the darker color while the rest of the indicators are displayed in the lighter color. In general, the proportionality is determined by dividing the current value by the range of possible current values. Once the proportionality is determined, the status region 212 is displayed with the proper number of location indicators 216 displayed in the darker color and the remainder of the location indicators 216 displayed in the lighter color. While the technique for determining proportionality has been described with reference to a vertical scrolling example, it should be noted that the technique is equally applicable to horizontal scrolling.

In one embodiment, once the status region 212 is displayed, it remains constantly visible. In another embodiment, the status region 212 remains visible for only a short period of time (e.g. a few seconds). After that, it disappears from the display. If any scrolling function is invoked, however, the status region 212 will reappear, and then disappear again after a certain period of time. These and other embodiments are within the scope of the present invention.

In addition to the status region 212, a control region 204 is also displayed (706). The control region 204 may be a minimal region such as those shown in FIGS. 2–5, or it may be an expanded region such as that shown in FIG. 6 with a plurality of activable controls 608. Whatever the case, the control region 204 provides the user with a set of activable controls which the user may invoke to cause information displayed in the display area to be scrolled. In one embodiment, the manner in which the controls 208, 608 of the control region 204 is displayed may change depending upon the portion of the information that is currently displayed in the display area. For example, if the information currently displayed in the display area is the beginning of the information set, then the controls 208a, 608e, 608c, 608a, which allow the user to scroll backward, are displayed in a lighter color while the controls 208b, 608b, 608d, 608f, which allow the user to scroll forward, are displayed in a darker color. The lighter color indicates to the user that the backward scrolling controls can no longer be activated (since the information cannot be scrolled backward any further). Similarly, if the information currently displayed in the display area is the last portion of the information set, then the controls 208b, 608b, 608d, 608f, which allow the user to scroll forward, are displayed in a lighter color while the controls 208a, 608e, 608c, 608a, which allow the user to scroll backward, are displayed in a darker color. The lighter color indicates to the user that the forward scrolling controls can no longer be activated (since the information cannot be scrolled forward any further). By displaying the control region 204 in this manner, additional scrolling feedback is provided to the user to make the scrolling process more intuitive.

With the information portion, the status region 212, and the control region 204 displayed, the scrolling mechanism is now ready for user input. Specifically, the scrolling mechanism waits (708) for scrolling events. In one embodiment, a scrolling event is an invocation of one of the activable scrolling controls of the control region 204. If no such invocation is detected, then the scrolling mechanism keeps waiting. If an invocation of any of the activable controls is detected, then the scrolling mechanism scrolls to the proper portion of the information set, and displays (710) the proper portion in the display area.

Because the information set has been scrolled, a different portion of the set of information is now displayed in the display area. To make the status region 212 (and possibly the control region 204) consistent with the new displayed portion, the scrolling mechanism needs to update (712) the status region 212 (and possibly the control region 204). To update these regions 212, 204, the scrolling mechanism determines the proportionality between the subset 220 and the remainder 224 of the location indicators 216 based upon the portion of the information that is currently being displayed. This proportionality is determined in the manner described above. Namely, the current value of the currently displayed portion is divided by the range of possible current values. Once the proportionality is determined, the status region 212 is updated to reflect the new subset 220 of darker color location indicators 216 and the new remainder 224 of lighter color location indicators 216.

In addition, the control region 204 may also need to be updated (712). If, for example, the user has scrolled to the beginning of the information set, then the control region 204 is updated to display the controls 208a, 608e, 608c, 608a which allow the user to scroll backward in a lighter color, while the controls 208b, 608b, 608d, 608f which allow the user to scroll forward are displayed in a darker color. If, on the other hand, the user has scrolled to the end of the information set, then the control region 204 is updated to display the controls 208b, 608b, 608d, 608f which allow the user to scroll forward in a lighter color, while the controls 208a, 608e, 608c, 608a which allow the user to scroll backward are displayed in a darker color. In addition, if the user has scrolled to somewhere in the middle of the information set, then the control region 204 is updated to display all of the controls in a darker color. In this manner, the control region 204 is updated to be consistent with the information currently displayed in the display area.

Once the status region 212 and the control region have been updated, the scrolling mechanism loops back to (708) to wait for more user input. This continues until the scrolling mechanism is no longer needed.

HARDWARE OVERVIEW

Figure 8:
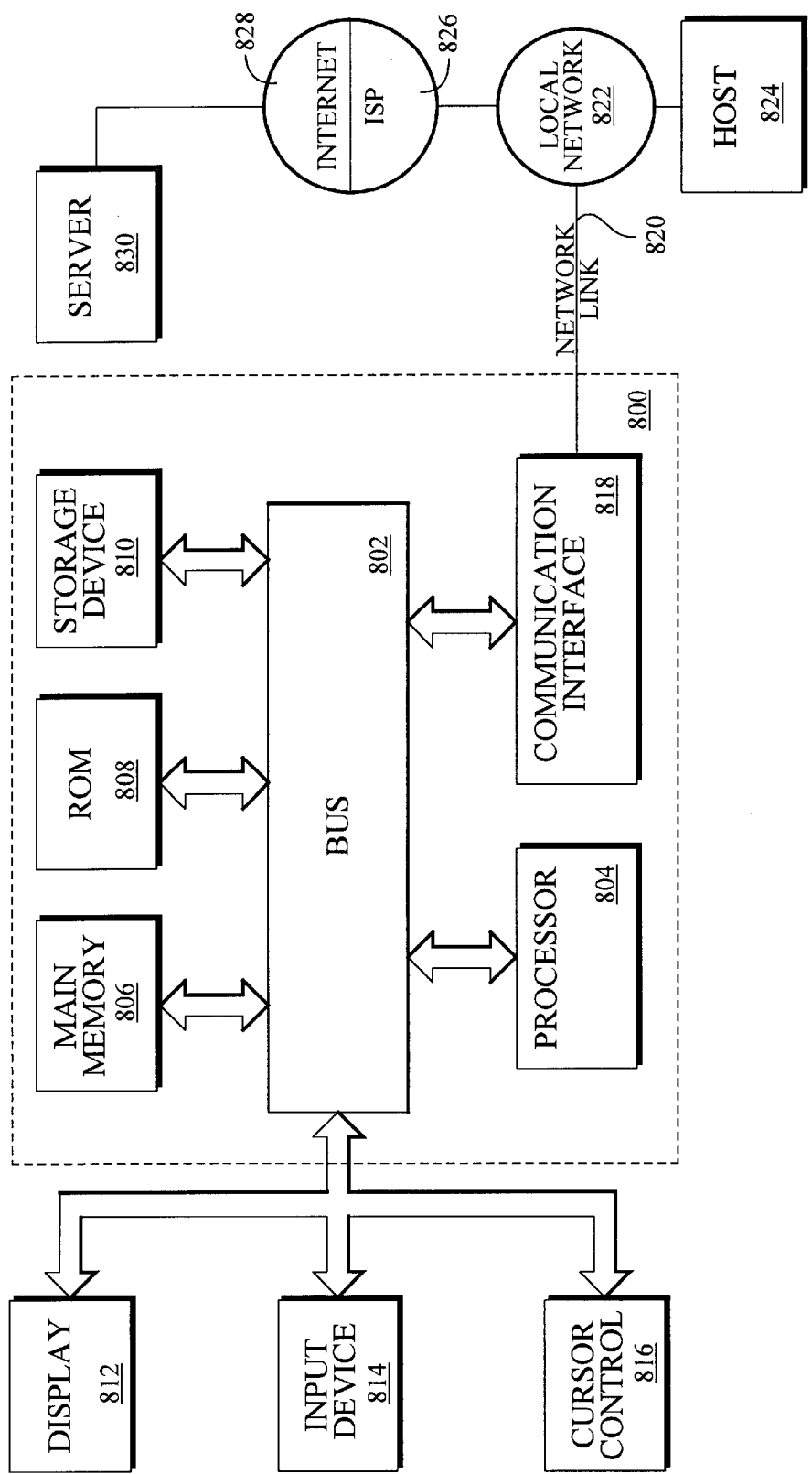
FIG. 8 is a block diagram of a general computer system in which the scrolling mechanism of the present invention may be implemented.

In one embodiment, the scrolling mechanism of the present invention is implemented as a set of computer instructions executed by one or more processors. FIG. 8 shows a block diagram of a general computer system 800 in which the present invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

According to an embodiment, the functionality of the present invention is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. In this manner, computer system 800 may obtain application code in the form of a carrier wave.

At this point, it should be noted that although the invention has been described with reference to specific embodiments, it should not be construed to be so limited. Various modifications can be made by those of ordinary skill in the art with the benefit of this disclosure without departing from the spirit of the invention.

Figure 9:
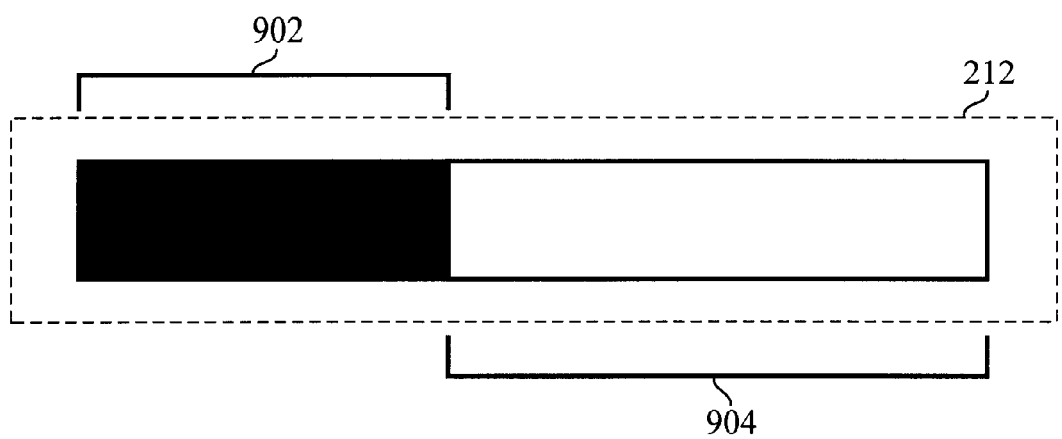
FIG. 9 shows an alternative implementation of the status region of the scrolling feedback mechanism of the present invention.

For example, instead of having a plurality of discreet location indicators in the status region, a single continuous location indicator, such as that shown in FIG. 9, may be implemented wherein a portion 902 of the indicator is filled in with a darker color while the remainder 904 of the indicator is left unfilled. As the user scrolls forward in the set of information, a greater portion of the indicator is filled. As the user scrolls backward, a lesser portion of the indicator is filled. This and other implementations are within the spirit of the present invention. Thus, the invention should not be limited by the specific embodiments used to illustrate it but only by the scope of the appended claims.

What is claimed is:

1. A computer-implemented method for providing visual feedback to a user, comprising:

displaying a portion of a set of information in a display area, wherein said set of information cannot be fully displayed in said display area;

displaying a control region, said control region comprising at least one activable control which may be activated via a user interface, and when activated, said activable control causing a different portion of said set of information to be displayed in said display area; and displaying a status region comprising a plurality of location indicators, a subset of said location indicators being displayed in a first manner and the remainder of said location indicators being displayed in a second and different manner, wherein said subset of said indicators is determined based upon which portion of said set of information is currently being displayed in said display area, wherein said subset of said indicators is empty when said portion of said set of information that is displayed in said display area is a beginning portion of said set of information, and wherein said subset of said indicators includes all of said indicators of said plurality when said portion of said set of information that is displayed in said display area is a last portion of said set of information.

2. The method of claim 1, wherein the portion of said set of information that is currently being displayed in said display area is a current portion, and wherein said subset of said indicators is determined based upon a relative position of said current portion within said set of information.

3. The method of claim 1, further comprising:

in response to an activation of said activable control, causing another portion of said set of information to be displayed in said display area;

determining, based upon said another portion of said set of information, an adjusted subset of said location indicators; and displaying said status region comprising said plurality of location indicators such that said adjusted subset of said indicators is displayed in said first manner and the remainder of said indicators is displayed in said second manner.

4. The method of claim 1, wherein displaying said status region comprises:

determining a size of an area in which said status region is to be displayed; and adjusting the number of location indicators based upon said size.

5. A computer-implemented method for providing visual feedback to a user, comprising:

displaying a portion of a set of information in a display area, wherein said set of information cannot be fully displayed in said display area;

displaying a control region, said control region comprising at least one activable control which may be activated via a user interface, and when activated, said activable control causing a different portion of said set of information to be displayed in said display area; and displaying a status region wherein a first portion of said status region is displayed in a first manner and the remainder of said status region is displayed in a second and different manner, and wherein the size of said first portion is determined based upon which portion of said set of information is currently being displayed in said display area, wherein said size of said first portion is zero when said portion of said set of information that is displayed in said display area is a beginning portion of said set of information, and wherein said size of said first portion is a size of said entire status region when said portion of said set of information that is displayed in said display area is a last portion of said set of information.

6. An apparatus for providing visual feedback to a user, comprising:

a mechanism for displaying a portion of a set of information in a display area, wherein said set of information cannot be fully displayed in said display area;

a mechanism for displaying a control region, said control region comprising at least one activable control which may be activated via a user interface, and when activated, said activable control causing a different portion of said set of information to be displayed in said display area; and a mechanism for displaying a status region comprising a plurality of location indicators, a subset of said location indicators being displayed in a first manner and the remainder of said location indicators being displayed in a second and different manner, wherein said subset of said indicators is determined based upon which portion of said set of information is currently being displayed in said display area, wherein said subset of said indicators is empty when said portion of said set of information that is displayed in said display area is a beginning portion of said set of information, and wherein said subset of said indicators includes all of said indicators of said plurality when said portion of said set of information that is displayed in said display area is a last portion of said set of information.

7. The apparatus of claim 6, wherein the portion of said set of information that is currently being displayed in said display area is a current portion, and wherein said subset of said indicators is determined based upon a relative position of said current portion within said set of information.

8. The apparatus of claim 6, further comprising:

a mechanism for causing, in response to an activation of said activable control, another portion of said set of information to be displayed in said display area;

a mechanism for determining, based upon said another portion of said set of information, an adjusted subset of said location indicators; and a mechanism for displaying said status region comprising said plurality of location indicators such that said adjusted subset of said indicators is displayed in said first manner and the remainder of said indicators is displayed in said second manner.

9. The apparatus of claim 6, wherein the mechanism for displaying said status region comprises:

a mechanism for determining a size of an area in which said status region is to be displayed; and a mechanism for adjusting the number of location indicators based upon said size.

10. An apparatus for providing visual feedback to a user, comprising:
- a mechanism for displaying a portion of a set of information in a display area, wherein said set of information cannot be fully displayed in said display area;
- a mechanism for displaying a control region, said control region comprising at least one activable control which may be activated via a user interface, and when activated, said activable control causing a different portion of said set of information to be displayed in said display area; and
- a mechanism for displaying a status region wherein a first portion of said status region is displayed in a first manner and the remainder of said status region is displayed in a second and different manner, and wherein the size of said first portion is determined based upon which portion of said set of information is currently being displayed in said display area,
- wherein said size of said first portion is zero when said portion of said set of information that is displayed in said display area is a beginning portion of said set of information, and
- wherein said size of said first portion is a size of said entire status region when said portion of said set of information that is displayed in said display area is a last portion of said set of information.

11. A computer readable medium having stored thereon a set of instructions which, when executed by one or more processors, causes the one or more processors to provide visual feedback to a user, comprising:
- instructions for causing one or more processors to display a portion of a set of information in a display area, wherein said set of information cannot be fully displayed in said display area;
- instructions for causing one or more processors to display a control region, said control region comprising at least one activable control which may be activated via a user interface, and when activated, said activable control causing a different portion of said set of information to be displayed in said display area; and
- instructions for causing one or more processors to display a status region comprising a plurality of location indicators, a subset of said location indicators being displayed in a first manner and the remainder of said location indicators being displayed in a second and different manner, wherein said subset of said indicators is determined based upon which portion of said set of information is currently being displayed in said display area,
- wherein said subset of said indicators is empty when said portion of said set of information that is displayed in said display area is a beginning portion of said set of information, and
- wherein said subset of said indicators includes all of said indicators of said plurality when said portion of said set of information that is displayed in said display area is a last portion of said set of information.

12. The computer readable medium of claim 11, wherein the portion of said set of information that is currently being displayed in said display area is a current portion, and wherein said subset of said indicators is determined based upon a relative position of said current portion within said set of information.

13. The computer readable medium of claim 11, further comprising:
- instructions for causing one or more processors to cause, in response to an activation of said activable control, another portion of said set of information to be displayed in said display area;
- instructions for causing one or more processors to determine, based upon said another portion of said set of information, an adjusted subset of said location indicators; and
- instructions for causing one or more processors to display said status region comprising said plurality of location indicators such that said adjusted subset of said indicators is displayed in said first manner and the remainder of said indicators is displayed in said second manner.

14. The computer readable medium of claim 11, wherein the instructions for causing one or more processors to display said status region comprises:
- instructions for causing one or more processors to determine a size of an area in which said status region is to be displayed; and
- instructions for causing one or more processors to adjust the number of location indicators based upon said size.

15. A computer readable medium having stored thereon a set of instructions which, when executed by one or more processors, causes the one or more processors to provide visual feedback to a user, comprising:
- instructions for causing one or more processors to display a portion of a set of information in a display area, wherein said set of information cannot be fully displayed in said display area;
- instructions for causing one or more processors to display a control region, said control region comprising at least one activable control which may be activated via a user interface, and when activated, said activable control causing a different portion of said set of information to be displayed in said display area; and
- instructions for causing one or more processors to display a status region wherein a first portion of said status region is displayed in a first manner and the remainder of said status region is displayed in a second and different manner, and wherein the size of said first portion is determined based upon which portion of said set of information is currently being displayed in said display area,
- wherein said size of said first portion is zero when said portion of said set of information that is displayed in said display area is a beginning portion of said set of information, and
- wherein said size of said first portion is a size of said entire status region when said portion of said set of information that is displayed in said display area is a last portion of said set of information.

* * * * *